US011416399B2

(12) United States Patent
Enrici et al.

(10) Patent No.: US 11,416,399 B2
(45) Date of Patent: Aug. 16, 2022

(54) DEDICATED MEMORY BUFFERS FOR SUPPORTING DETERMINISTIC INTER-FPGA COMMUNICATION

(71) Applicant: Nokia Solutions and Networks Oy, Espoo (FI)

(72) Inventors: Andrea Enrici, Bourg la Reine (FR); Bogdan Uscumlic, Les Ulis (FR)

(73) Assignee: Nokia Solutions and Networks Oy, Espoo (FI)

( * ) Notice: Subject to any disclaimer, the term of this patent is extended or adjusted under 35 U.S.C. 154(b) by 1 day.

(21) Appl. No.: 16/911,680

(22) Filed: Jun. 25, 2020

(65) Prior Publication Data
US 2021/0406178 A1 Dec. 30, 2021

(51) Int. Cl.
*G06F 12/0806* (2016.01)

(52) U.S. Cl.
CPC .. *G06F 12/0806* (2013.01); *G06F 2212/1008* (2013.01)

(58) Field of Classification Search
CPC ........ G06F 12/0804; G06F 2212/1008; G06F 12/0806; G06F 15/167; G06F 15/76
See application file for complete search history.

(56) References Cited

U.S. PATENT DOCUMENTS

| 8,745,626 B1* | 6/2014 | Sandstrom | G06F 9/5027 718/102 |
| 2015/0046675 A1* | 2/2015 | Barry | G06F 9/3867 712/7 |
| 2019/0042329 A1* | 2/2019 | Kakaiya | G06F 13/4282 |
| 2019/0146943 A1* | 5/2019 | Fender | G06F 13/4072 710/105 |
| 2020/0310994 A1* | 10/2020 | ChoFleming | G06F 12/0857 |

OTHER PUBLICATIONS

Abel et al., "An FPGA Platform for Hyperscalers", IEEE 25th Annual Symposium on High-Performance Interconnects (HOTI), Aug. 28, 2017, 4 pages.
(Continued)

*Primary Examiner* — Hashem Farrokh
(74) *Attorney, Agent, or Firm* — Tong, Rea, Bentley & Kim, LLC

(57) ABSTRACT

A server includes a field programmable gate array (FPGA) partitioned into a set of partial reconfiguration (PR) slots and a memory that supports a set of logical buffers. A deterministic application request module (DARM) receives application requests to allocate the set of reconfiguration slots to one or more tenants and the one or more tenants configure the allocated reconfiguration slot to perform tasks. The DARM stores data associated with the application request in a first logical buffer from the set of logical buffers. A reconfiguration slot scheduling (RSS) module identifies a first reconfiguration slot from the set of reconfiguration slots and associates the first reconfiguration slot with the first logical buffer. A reconfiguration slot initialization (RSI) module reconfigures the first reconfiguration slot to perform the tasks based on the data stored in the first logical buffer.

19 Claims, 6 Drawing Sheets

(56) References Cited

OTHER PUBLICATIONS

Chen et al., "Enabling FPGAs in the Cloud", 11th Annual ACM Conference on Computing Frontiers, Article No. 3, May 2014, 10 pages.
Ringlein, et al., "System Architecture for Network-Attached FPGAs in the Cloud Using Partial Reconfiguration", 29th International Conference on Field Programmable Logic and Applications (FPL), Sep. 8, 2019, 8 pages.
Weerasinghe, et al., "Disaggregated FPGAs: Network Performance Comparison against Bare-Metal Servers, Virtual Machines and Linux Containers", IEEE International Conference on Cloud Computing Technology and Science (CloudCom), Dec. 12, 2016, 8 pages.
Weerasinghe, et al., "Enabling FPGAs in Hyperscale Data Centers", 12th International Conference on Ubiquitous ntelligence and Computing (UIC), Aug. 10, 2015, 9 pages.
Weerasinghe, et al., "Network-Attached FPGAs for Data Center Applications", International Conference on Field-Programmable Technology (FPT), Dec. 7, 2016, 8 pages.

\* cited by examiner

DEDICATED MEMORY BUFFERS FOR SUPPORTING DETERMINISTIC INTER-FPGA COMMUNICATION

BACKGROUND

A field-programmable gate array (FPGA) is an integrated circuit designed to be configured to perform different functions after the FPGA is fabricated, i.e., an FPGA is commonly programmed after deployment in the field. Conventional FPGAs contain an array of Configurable Logic Blocks (CLBs), and a hierarchy of reconfigurable interconnects that allow the CLBs to be wired together in different configurations to perform different logic operations. For example, the CLBs in an FPGA can be configured to perform logical operations ranging from simple logic gates (e.g., AND, NAND, OR, XOR, etc.) to complex combinational functions. In some cases, the CLBs also include memory blocks or specialized Digital Signal Processing blocks (DSPs) that are preconfigured to rapidly execute some common operations (e.g., filters). In addition to servers that provide virtual memory and processing resources, a cloud data server can also offer reconfigurable hardware that is implemented using FPGAs to accelerate data-intensive or time-sensitive computations. The FPGAs in a cloud network are typically interconnected in a mesh network that includes one or FPGAs and other processing nodes such as central processing units (CPUs), graphics processing units (GPUs), and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
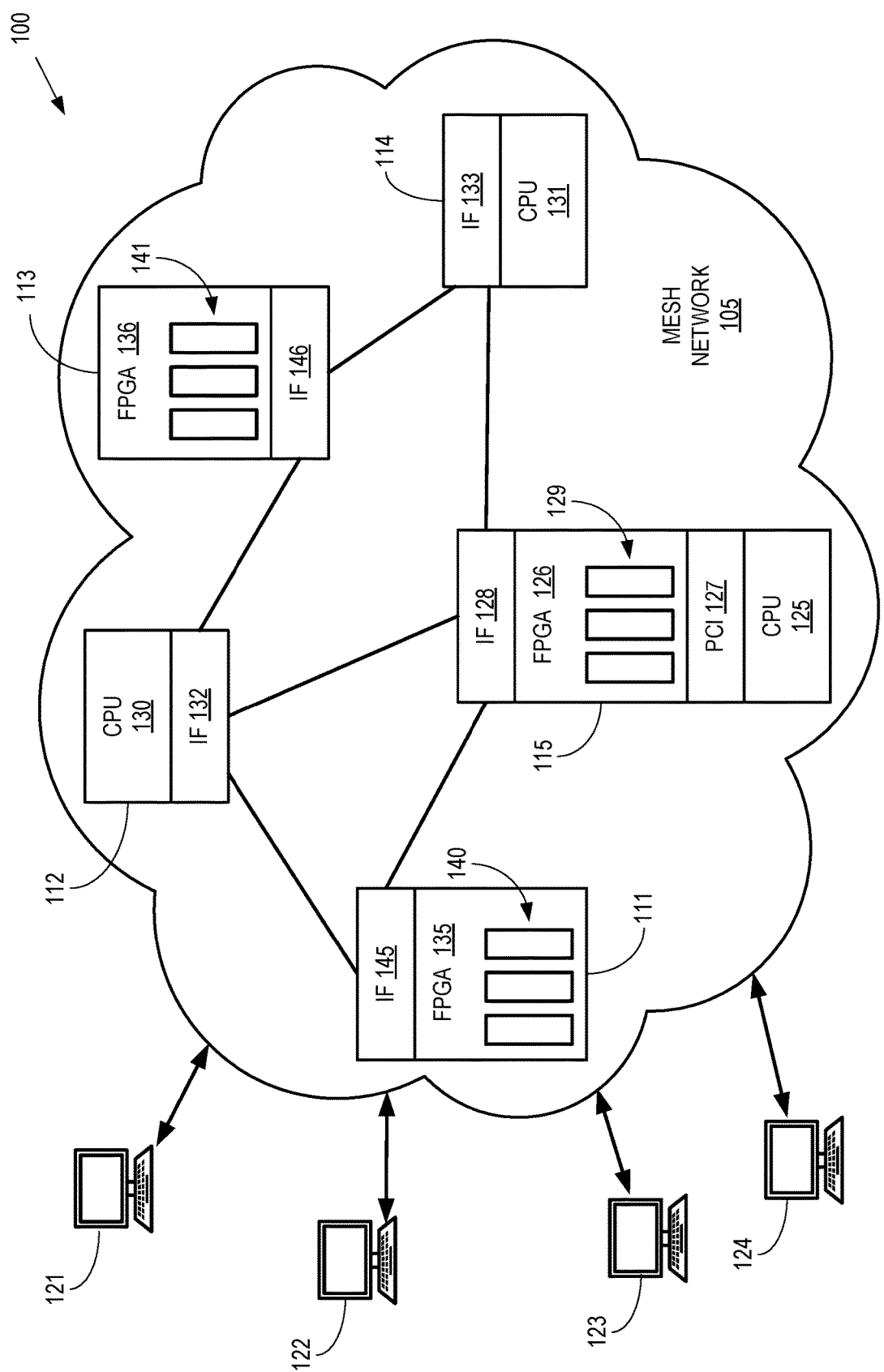
FIG. 1 is a block diagram of a communication system that includes a mesh network that supports deterministic communication between field programmable gate arrays (FPGAs) according to some embodiments.

Cloud networks that operate according to Fifth Generation (5G) standards are required to satisfy stringent latency requirements. For example, 5G communication systems implement Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Most of the signal processing for a 5G network is done by cloud servers rather than close to the radio antennas that support wireless communication, e.g., with Internet of Things (IoT) devices. The cloud server architecture is referred to herein as Cloud Radio Access Network (C-RAN). The latency requirements for C-RAN are even more stringent: round trip time budgets are expected to be in the range of 200 to 500 microseconds (µs). One approach to satisfying the 5G latency requirements is "deterministic networking." Packet arrival times and latencies are known accurately in advance in a deterministic network. One deterministic networking technique is time-aware shaping of packets, in which a transmission scheduler selects packets for scheduling from a set of ingress queues. The FPGAs in a cloud network perform operations in hardware without sources of non-determinism such as caches and software layers and can therefore accelerate packet processing and forwarding to support deterministic traffic latencies.

A conventional FPGA (or other form of programmable hardware circuitry that can be reconfigured to perform different operations) in a cloud network is physically partitioned into reconfiguration slots (or the resources of the FPGA are virtually partitioned into resource subsets) that are independently allocated to multiple tenants. Slots can be partially or totally reconfigured during execution of a function. Thus, some embodiments of the reconfiguration slots are referred to as partial reconfiguration (PR) slots to indicate that the slot can be partially reconfigured during execution of the function. The terms "reconfiguration slot" and "PR slot" are understood to refer to either physical or virtual resources of the FPGA that are independently allocated to different tenants. Each reconfiguration slot is reconfigurable to execute new functions in response to finishing execution of a previous set of functions encoded in the reconfiguration slot. Reconfiguration of a PR slot may be performed while other entities in the cloud network are still running, e.g., concurrently with execution of other functions on other PR slots in the FPGA. However, random access memory (RAM) in the FPGA is a resource that is available for allocation in a partial reconfiguration process. Consequently, the RAM in the FPGA is shared by the PR slots and tenants of the FPGA. Sharing the RAM in a multi-tenant FPGA introduces a source of non-determinism that potentially increases latency in the cloud network. For example, if a PR slot is allocated to a new tenant, the new tenant provides instructions for reconfiguring the PR slot and the provided instructions (as well as any data to be processed by the configured PR slot) are stored in the shared RAM. However, sufficient space in the shared RAM may not be available if other tenants of other PR slots have occupied the available space in the shared RAM. In that case, incoming packets are dropped or lost and retransmissions are needed, which increases latency and causes non-determinism due to, for example, potentially varying transmission times.

FIGS. 1-6 disclose field programmable gate arrays (FPGAs) in a cloud network that include a set of reconfiguration slots to provide a subset of the circuitry in the FPGA for allocation to, and configuration by, multiple tenants. Logical buffers in random access memory (RAM) are allocated to the reconfiguration slots and at least one logical buffer is reserved for the exclusive use of each of the reconfiguration slots. Thus, the term "logical buffer" refers herein to a logical or physical portion of memory that stores data or instructions that are used to configure a reconfiguration slot in an FPGA for a tenant and to execute operations of tasks performed by the reconfiguration slot of the FPGA for the tenant. Some embodiments of logical buffers are implemented in off-chip RAM associated with the FPGA. Instructions or data associated with tasks performed by the reconfiguration slots are stored in the corresponding logical buffer. In some embodiments, a deterministic application request module (DARM) receives an application request to allocate one or more reconfiguration or PR slots to the tenant. Data associated with the application request is stored in an available logical buffer. A scheduling function such as a PR slot scheduling (PRSS) function identifies an available PR slot and associates the PR slot with the logical buffer that stores the data associated with the application request. Thus, the PRSS function dedicates the logical buffer to the associated PR slot. The DARM instructs a reconfiguration slot initialization module such as a partial reconfiguration slot initialization (PRSI) module to configure (or reconfigure) the allocated PR slot based on the data stored in the logical buffer. The PRSI module signals completion of the reconfiguration of the DARM and sends information indicating the latency required by the application that is utilizing the PR slot. The DARM begins execution of the PR slot and processes data from the logical buffer, e.g., by performing a management decision based on a policy. Some embodiments of the DARM process the data in the order of arrival, although other scheduling algorithms are also possible. For example, the DARM can use out of order scheduling as long as the deadline at which a task must be completed is respected. Newly arriving data is stored and delayed in the logical buffer for the requested latency, thereby guaranteeing end-to-end deterministic latency without data losses.

FIG. 1 is a block diagram of a communication system 100 that includes a mesh network 105 that supports deterministic communication between field programmable gate arrays (FPGAs) according to some embodiments. The mesh network 105 includes servers 111, 112, 113, 114, 115 (collectively referred to herein as "the servers 111-115") that provide services to one or more tenants 121, 122, 123, 124 (collectively referred to herein as "the tenants 121-124"). Some embodiments of the mesh network 105 are used to implement a cloud data center such as a 5G cloud data center. The tenants 121-124 can therefore request access to portions of the resources in the mesh network 105, such as portions of the computing power provided by the servers 111-115. The portions can be physical resources (e.g., processors, processor cores, or subsets of FPGAs) or virtual resources (e.g., virtual machines or circuitry supported by underlying physical resources). The physical and virtual resources are collectively referred to herein as logical resources. Although a mesh network 105 is shown in FIG. 1, some embodiments of the communication system 100 include other types of networks or servers that are not necessarily connected to each other via a network.

The servers 111-115 include processor-only servers 112, 114 such as servers that only include a CPU (or a graphics processing unit, GPU, in some cases), FPGA-only servers 111, 113, and mixed CPU/FPGA servers 115. Although a single processor or FPGA is shown in the servers 201-205 in the interest of clarity, some embodiments of the servers 201-205 include more than one processor or FPGA. In the illustrated embodiment, the server 115 includes a master CPU 125 that manages the associated FPGA 126 using signals exchanged via an interface such as a peripheral component interface (PCI) 127. The CPU 125 and the FPGA 126 are interconnected with the other servers 112-114 and (if allocated) with one or more of the tenants 121-124 via the interface 128. The FPGA 126 includes a set 129 of partial reconfiguration (PR) slots that are separately and independently allocated to one or more of the tenants 121-124. As discussed herein, logical slots in the set 129 are implemented as physical slots or portions of the FPGA 126 or virtual slots. The servers 112, 114 include CPUs 130, 131 that are interconnected with the other servers 111, 113, 115 and (if allocated) with one or more of the tenants 121-124 via the interfaces 132, 133. However, the servers 111-115 do not require the presence of the CPU. For example, the servers 111, 113 include the FPGAs 135, 136 and do not include a master CPU. The FPGAs 135, 136 include corresponding sets 140, 141 of PR slots that are separately and independently allocated to one or more of the tenants 121-124. The FPGAs 135, 136 are interconnected with the other servers 112, 114, 115 and (if allocated) with one or more of the tenants 121-124 via the interfaces 145, 146.

Some embodiments of the FPGAs 126, 135, 136 are used to accelerate packet processing and forwarding to achieve deterministic traffic latencies because the FPGAs 126, 135, 136 perform operations in hardware without sources of non-determinism (e.g., caches and software layers). Moreover, executing some functions on the FPGAs 126, 135, 136 can be less time consuming and energy consuming than execution on general-purpose CPUs such as the CPUs 125, 130, 131. The PR slots in the sets 129, 140, 141 are reconfigured (reprogrammed) to execute new functions when, e.g., a set of previous functions has finished execution and there are no reconfigurable resources left. The PR slots can be reconfigured while FPGA is running. Typically, some PR slots in a data center implemented using the mesh network 105 are available (not yet allocated to a user or allocated to a user who is not active) and some are busy (allocated to a user and running some tasks) during the normal data center operation.

Within a partition of the PR slots on one of the FPGAs 126, 135, 136, the tenants 121-124 are free to use logical resources of the FPGA that are exclusively allocated to the tenants 121-124. The logical resources of the FPGA are implemented using reconfigurable physical resources, e.g., the Configurable Logic Blocks, memory blocks, Digital Signal Processing blocks, and the like. The FPGAs 125, 135, 136 include (or have access to) additional memory such as a random access memory (RAM). However, off-chip RAM memory used by the FPGAs of conventional servers, which is not part of the reconfigurable resources of the FPGA, is not included in the resources that are allocated in the reconfiguration process. In conventional servers, the tenants 121-124 of different PR slots are therefore required to share the available memory of the FPGAs 125, 135, 136. As discussed herein, sharing of the available memory can result in incoming packets being dropped or lost. Retransmissions are needed to replace or correct the errors in the transmitted packets, which increases latency and causes non-determinism.

Some embodiments of the servers 111, 113, 115 therefore include memories (not shown in FIG. 1 in the interest of clarity) that support sets of logical buffers that are available to be dedicated to the PR slots on the corresponding FPGAs 126, 135, 136. In some embodiments, one or more logical buffers are pre-allocated and reserved for each of the PR slots in the sets 129, 140, 141. The servers 111, 113, 115 receive application requests to allocate the corresponding sets 129, 140, 141 of PR slots to one or more of the tenants 121-124 and the tenants 121-124 configure the allocated PR slots to perform tasks. Data associated with the application request is stored in a logical buffer that is chosen from the set of logical buffers. One or more of the PR slots in the corresponding sets 129, 140, 141 is associated with the chosen logical buffers and the chosen PR slots are reconfigured to perform the tasks based on the data stored in corresponding logical buffer. Thus, the logical buffer is dedicated to the chosen PR slot. In some embodiments, the PR slots and associated logical buffers are associated with a latency required by the tasks. In that case, data and instructions associated with the tasks are delayed in the logical buffers for a time interval corresponding to the latency. Thus, the FPGAs 126, 135, 136 support deterministic communication at the requested latency.

Figure 2:
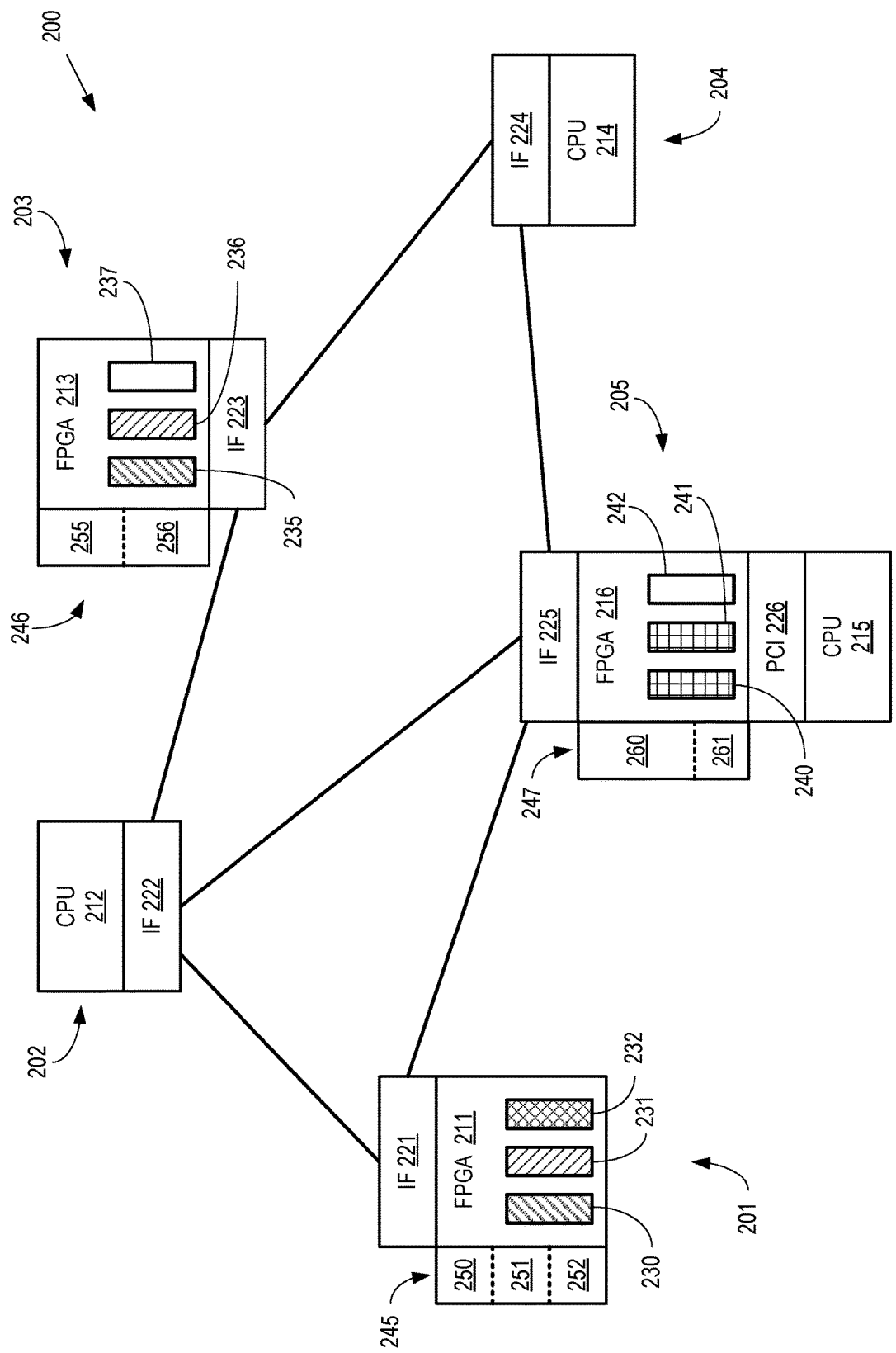
FIG. 2 is a block diagram of a mesh network including servers that support allocations of portions of FPGAs to tenants according to some embodiments.

FIG. 2 is a block diagram of a mesh network 200 including servers 201, 202, 203, 204, 205 that support allocations of portions of FPGAs to tenants according to some embodiments. The mesh network 200 is used to implement some embodiments of the mesh network 105 shown in FIG. 1 and the servers 201-205 correspond to some embodiments of the servers 111-115 shown in FIG. 1. In the illustrated embodiment, the servers 201, 203 include the FPGAs 211, 213 and do not include a master CPU. The FPGAs 211, 213 are interconnected with the other servers 202, 204, 205 via the interfaces 221, 223. The servers 202, 204 include CPUs 212, 214 that are interconnected with the other servers 201, 203, 205 via the interfaces 222, 224. The server 205 includes a master CPU 215 that manages the associated FPGA 216 using signals exchanged via an interface such as a peripheral component interface (PCI) 226. The CPU 215 and the FPGA 216 are interconnected with the other servers 201-204 via the interface 225.

The FPGAs 211, 213, 216 include corresponding sets of PR slots that are allocated to one or more tenants such as the tenants 121-124 shown in FIG. 1. Logical slots in the sets are implemented as physical slots on the FPGAs 211, 213, 216 or virtual slots that utilize the physical resources of the FPGAs 211, 213, 216. As used herein, the term "virtual slot" refers to a logical portion of the resources of the FPGAs 211, 213, 216 that is allocated to the tenants 121-124 and shared with other virtual slots, e.g., on a time multiplexed basis. In the illustrated embodiment, the FPGA 211 includes the PR slots 230, 231, 232, the FPGA 213 includes the PR slots 235, 236, 237, and the FPGA 216 includes the PR slots 240, 241, 242. Portions of the FPGAs 211, 213, 216 have been allocated to tenants and the portions are configured by the tenants to perform one or more tasks. In the illustrated embodiment, the PR slots 230, 235 are allocated to a first tenant, the PR slots 231, 236 are allocated to a second tenant, the PR slots 232 is allocated to a third tenant, and the PR slots 240, 241 are allocated to a fourth tenant. The PR slots 237, 242 are not allocated to a tenant and are available for allocation.

Memories 245, 246, 247 are integrated into (or accessible to) the FPGAs 211, 213, 216 and store instructions or data associated with tasks that are executed by portions of the FPGAs 211, 213, 216. Some embodiments of the memories 245-247 are implemented as random access memories (RAMs) such as dynamic RAM (DRAM), static RAM (SRAM), nonvolatile RAM (NVRAM), and the like. The memories 245-247 can be implemented in various granularities (e.g., blocks, Look-Up Tables) and locations (e.g., on-chip, off-chip, or off-board). As used herein, the terms "memory" or "RAM" refer to the logical memory space that is mapped on a physical RAM memory.

The memories 245-247 are shared by the tenants that are allocated portions of the corresponding FPGAs 211, 213, 216. Portions of the memories 245-247 are allocated to the tenants of the FPGA 211, 213, 216 and the respective allocated PR slots. The allocated portions of the memory 245-247 are for the exclusive use of the corresponding tenant, e.g., to store instructions or data for configuration and execution of tasks. In the illustrated embodiment, the portions 250, 251, 252 of the memory 245 are allocated to the PR slots 230, 231, 232 (and respective tenants), respectively. The portions 255, 256 of the memory 246 are allocated to the PR slots 235, 236 (and respective tenants), respectively. The portions 260, 261 of the memory 247 are allocated to the PR slots 240, 241 (and respective tenants), respectively.

Figure 3:
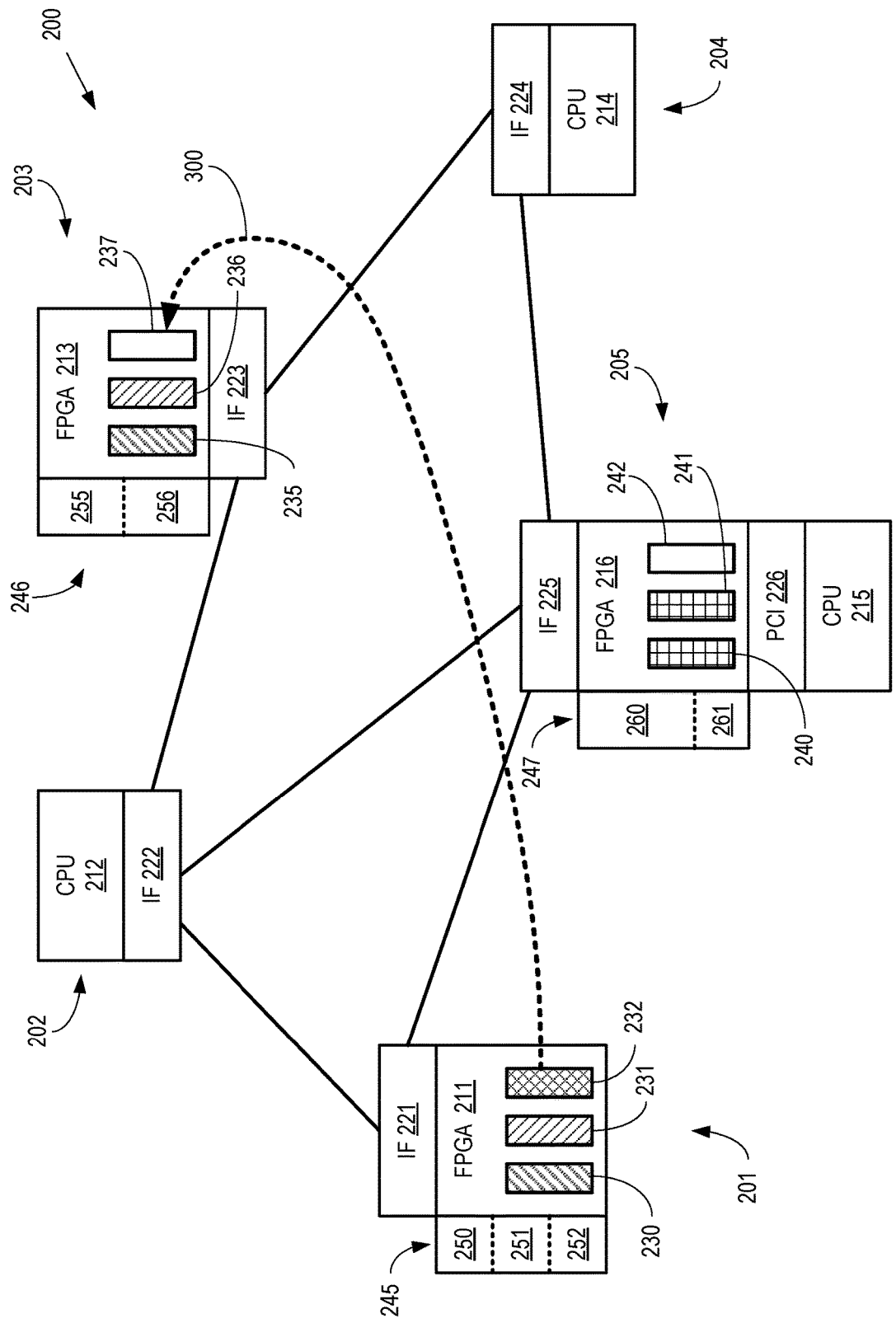
FIG. 3 is a block diagram of the mesh network of FIG. 2 in the process of being reconfigured in response to the arrival of a new task for execution by a tenant according to some embodiments.

FIG. 3 is a block diagram of the mesh network 200 in the process of being reconfigured in response to the arrival of a new task for execution by a tenant according to some embodiments. The reference numerals in FIG. 3 refer to corresponding elements in FIG. 2 indicated by the same reference numerals in FIGS. 2 and 3. In the illustrated embodiment, the third tenant is initially allocated the PR slots 232 in the FPGA 211 for performing one or more tasks. A new task arrives or is initiated by the third tenant and so the third tenant initiates expansion of its footprint within the mesh network 200 to include the PR slot 237 in the FPGA 213, as indicated by the arrow 300. Although a single additional PR slot 237 is shown in the illustrated embodiment, the number of reconfiguration or PR slots required by different tasks depends on the characteristics of the task, configuration of the PR slots, performance of the PR slots, PR slot mapping and scheduling policies of a server or network orchestrator, and the like. The PR slot 237 needs to be reconfigured to execute the new task. However, the resources 255, 256 of the memory 247 are allocated to the PR slots 235, 236 (and corresponding tenants) and none (or an insufficient amount) of the memory 247 is available for allocation to the new task. Traffic including instructions or data for the new task arriving at the memory 247 can therefore be lost or corrupted, which increases latency and leads to non-determinism, as discussed herein.

Figure 4:
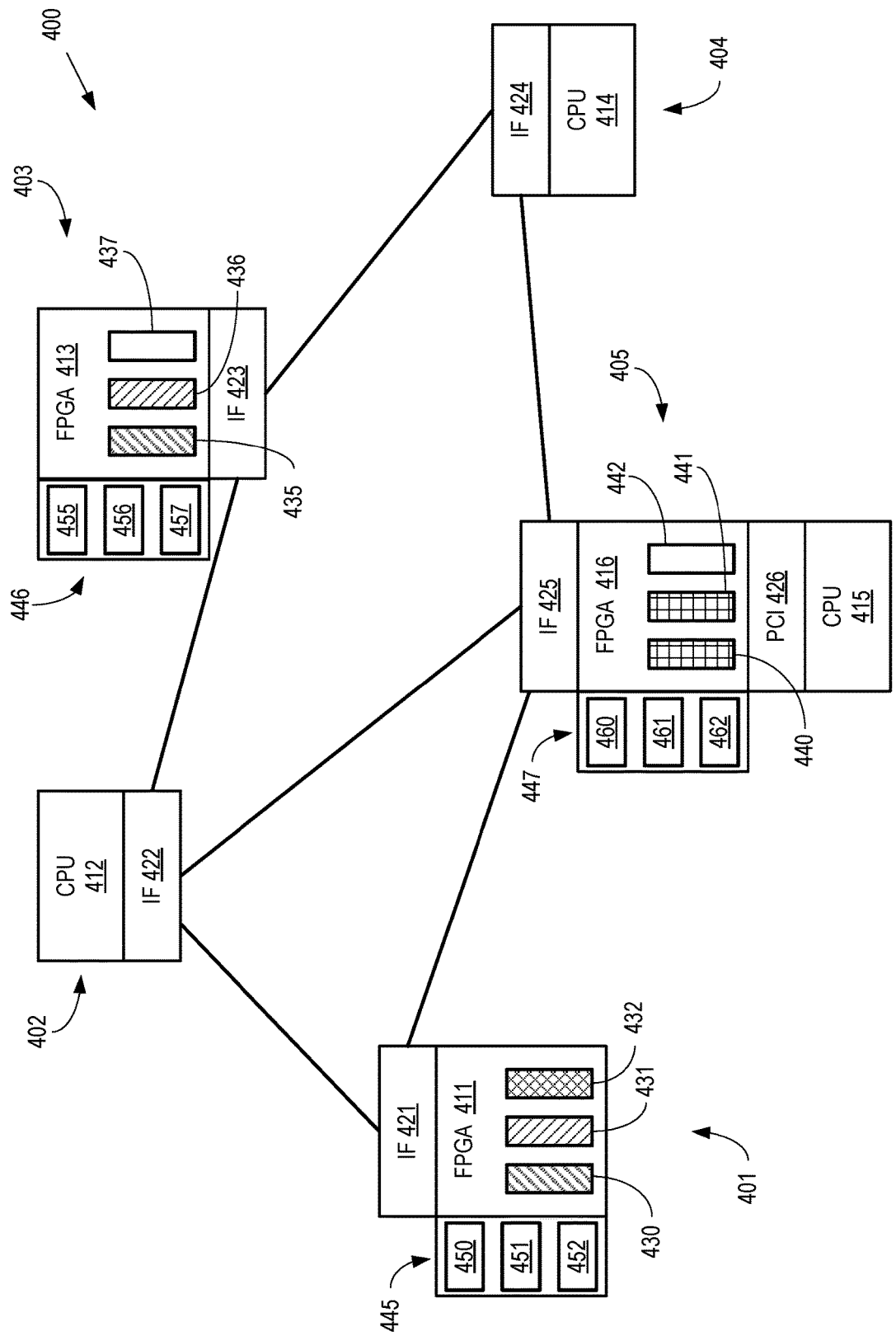
FIG. 4 is a block diagram of a mesh network including servers that support deterministic communication between FPGAs using logical buffers according to some embodiments.

FIG. 4 is a block diagram of a mesh network 400 including servers 401, 402, 403, 404, 405 that support deterministic communication between FPGAs using logical buffers according to some embodiments. The mesh network 400 is used to implement some embodiments of the mesh network 105 shown in FIG. 1 and the servers 401-405 correspond to some embodiments of the servers 111-115 shown in FIG. 1. In the illustrated embodiment, the servers 401, 403 include the FPGAs 411, 413 and do not include a master CPU. The FPGAs 411, 413 are interconnected with the other servers 402, 404, 405 via the interfaces 421, 423. The servers 402, 404 include CPUs 412, 414 that are interconnected with the other servers 401, 403, 405 via the interfaces 422, 424. The server 405 includes a master CPU 415 that manages the associated FPGA 416 using signals exchanged via an interface such as a PCI 426. The CPU 415 and the FPGA 416 are interconnected with the other servers 401-404 via the interface 425.

The FPGAs 411, 413, 416 include corresponding sets of PR slots that are allocated to one or more tenants such as the tenants 121-124 shown in FIG. 1. Logical slots in the sets are implemented as physical slots or portions of the FPGAs 411, 413, 416 or virtual slots that utilize the physical resources of the FPGAs 411, 413, 416. In the illustrated embodiment, the FPGA 411 includes the PR slots 430, 431, 432, the FPGA 413 includes the PR slots 435, 436, 437, and the FPGA 416 includes the PR slots 440, 441, 442. Portions of the FPGAs 411, 413, 416 have been allocated to tenants and the portions are configured by the tenants to perform one or more tasks. In the illustrated embodiment, the PR slots 430, 435 are allocated to a first tenant, the PR slots 431, 436 are allocated to a second tenant, the PR slots 432 is allocated to a third tenant, and the PR slots 440, 441 are allocated to a fourth tenant. The PR slots 437, 442 are not allocated to a tenant and are available for allocation.

Memories 445, 446, 447 are integrated into (or accessible to) the FPGAs 411, 413, 416. The memories 445-447 include (or are partitioned into) sets of logical buffers that are available for the exclusive use of corresponding PR slots in the FPGAs 411, 413, 416, i.e., the logical buffers are available to be dedicated to the corresponding PR slots. The logical buffers are pre-allocated and reserved for PR slots so that at least one logical buffer is available for each PR slot regardless of whether the PR slot is currently allocated or available for subsequent allocation. The number of logical buffers in the memories 445-447 is therefore equal to or greater than the number of PR slots in the corresponding FPGAs 411, 413, 416. In the illustrated embodiment, logical buffers 450, 451, 452 are exclusively allocated to (or dedicated to) the PR slots 430-432, respectively. The logical buffers 455, 456 are exclusively allocated to the PR slots 435, 436, respectively, and the logical buffer 457 is available for allocation, e.g., to the PR slot 437. The logical buffers 460, 461 are exclusively allocated to the PR slots 440, 441, respectively, and the logical buffer 462 is available for allocation, e.g., to the PR slot 442.

The logical buffers 450-452, 455-437, 460-462 provide a minimum amount of memory that is guaranteed for allocation to the corresponding PR slots 430-432, 435-437, 440-442. The minimum amount is determined to provide network buffering that prevents the loss of instructions or data associated with tasks being performed by the PR slots 430-432, 435-437, 440-442, as well as providing sufficient space for the storage of data and instructions needed for communication between tasks. The logical buffers 450-452, 455-437, 460-462 also remove sources of non-determinism and support performance of tasks with latencies required by the tasks implemented by the PR slots 430-432, 435-437, 440-442, as discussed herein.

Figure 5:
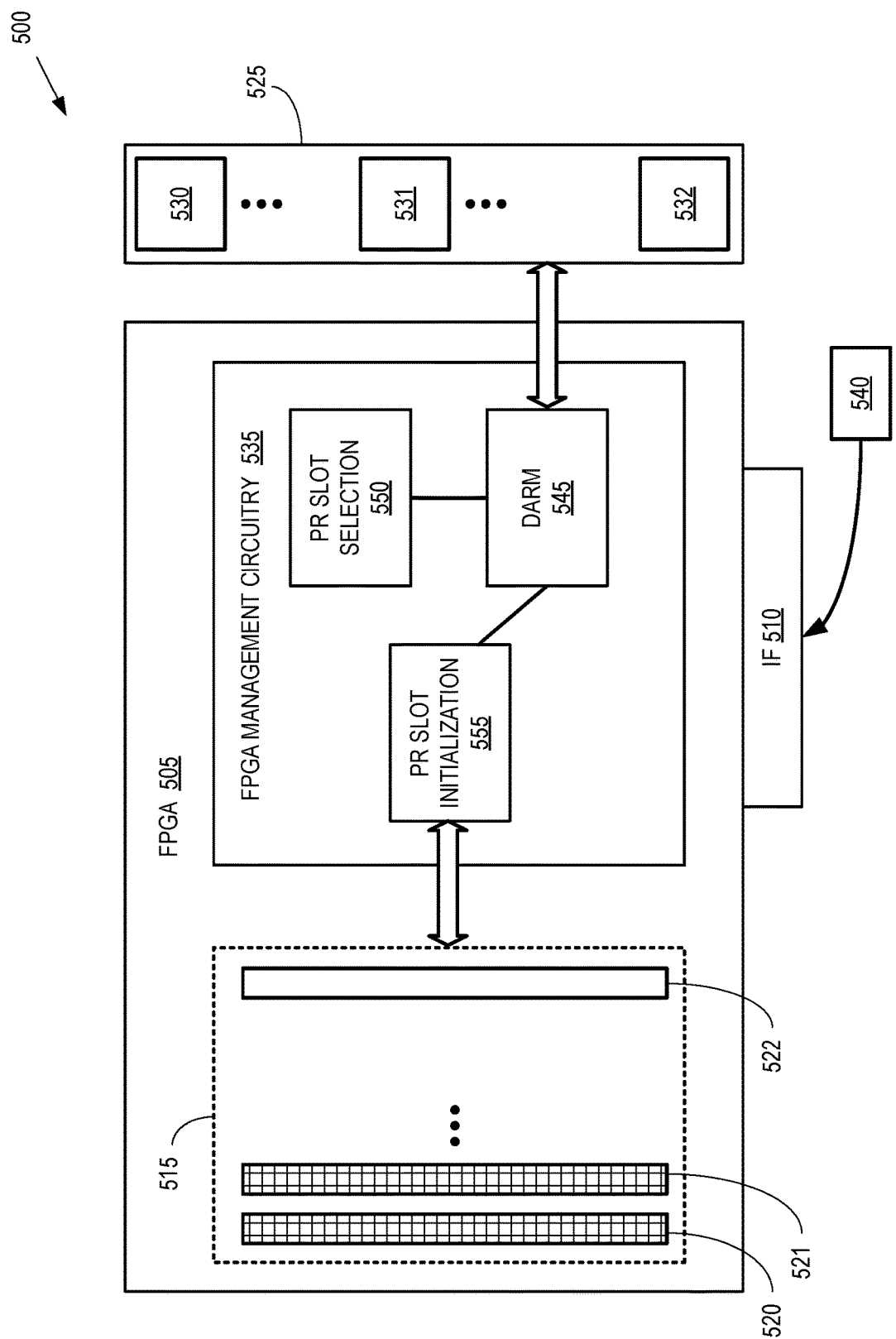
FIG. 5 is a block diagram of a server that supports deterministic communication between FPGAs in a network using logical buffers according to some embodiments.

FIG. 5 is a block diagram of a server 500 that supports deterministic communication between FPGAs in a network using logical buffers according to some embodiments. The server 500 is used to implement some embodiments of the servers 111-115 shown in FIG. 1 and the servers 401-405 shown in FIG. 4. The server 500 implements an FPGA 505 that is interconnected with other servers and tenants via an interface 510, as discussed herein. The resources of the FPGA 505 are partitioned into a set 515 of PR slots 520, 521, 522, which are collectively referred to herein as "the PR slots 520-522." The FPGA 505 includes (or has access to) a memory 525 that includes a set of logical buffers 530, 531, 532, which are collectively referred to herein as "the logical buffers 530-532." The number of logical buffers 530-532 is equal to or greater than the number of PR slots 520-522 and the logical buffers 530-532 are pre-allocated so that they are available to the PR slots 520-522 regardless of whether the PR slots 520-522 have been allocated to a tenant or are available for allocation to a tenant.

The server 500 includes FPGA management circuitry 535 that allocates and configures the PR slots 520-522 and the logical buffers 530-532, e.g., in response to receiving an application request 540. The FPGA management circuitry 535 supports deterministic allocation of shared resources such as the PR slots 520-522. The FPGA management circuitry 535 also ensures that tasks implemented in the PR slots 520-522 are performed with a requested latency such as a latency requested in the application request 540.

Some embodiments of the FPGA management circuitry 535 include a deterministic application request module (DARM) 545 that receives the incoming application request 540 and stores information (such as instructions or data) conveyed by the application request 540 in one of the available logical buffers 530-532. In some cases, the information in the application request 540 is stored without loss or corruption to the information because at least the corresponding logical buffer of the logical buffers 530-532 is guaranteed to be available. For example, if the logical buffers 530, 531 are allocated to the PR slots 520, 521 prior to reception of the application request 540, the logical buffer 532 remains available for immediate storage of information included in the application request 540. In response to, or concurrently with, storing the information from the application request 540 in one of the logical buffers 530-532, the DARM 545 initiates a search for an available PR slot.

Some embodiments of the FPGA management circuitry 535 include a reconfiguration slot selection module such as a partial reconfiguration slot selection (PRSS) module 550 that identifies an available PR slot in response to receiving the application request 540. For example, the DARM 545 can signal the PRSS module 550 to identify an available PR slot. The PRSS module 550 identifies an available slot such as the PR slot 522 and allocates the PR slot 522 to the tenant/task associated with the application request 540. The PRSS module 550 then sends a signal to the DARM 545 indicating the available PR slot 522. Configuration of the PR slot 522 begins in response to the PRSS module 550 identifying the available PR slot 522.

Some embodiments of the FPGA management circuitry 535 include a partial reconfiguration slot initialization (PRSI) module 555 that configures the PR slots 520-522 to execute tasks for tenants. The PRSI module 555 determines whether the task is to be performed with a deterministic latency, e.g., using settings associated with the PR slots 520-522, indicated in the application request 540, or using other information. The PRSI module 555 signals the DARM 545 in response to (or concurrently with) completing the reconfiguration process. The signaling includes information indicating a latency (Ts) required for the task. The latency (Ts) depends on characteristics of the task indicated in the application request 540 and on the physical properties of the FPGA 505 and the allocated PR slots 520-522.

In response to receiving the signaling indicating the latency, the DARM 545 begins executing the task, e.g., the task that is executed on the reconfigured PR slot 522 in response to receiving the application request 540. The DARM 545 generates an order to process the data for the application request 540, e.g., in order of arrival of the data or instructions or using out-of-order processing that meets task completion deadlines. Data or instructions that were previously stored in the logical buffer 532 are processed prior to data or instructions that are received more recently. Deterministic processing latency is guaranteed for the data or instructions associated with the application request 540 by storing newly arrived data in the logical buffer 532 and delaying the received data for the latency (Ts) prior to processing. In the illustrated embodiment, the FPGA management circuitry 535 is implemented in hardware so that the processing latency introduced by the hardware is less than the latencies necessary to support end-to-end deterministic latency without data losses. However, in other embodiments, other configurations (e.g., configurations where portions of the FPGA management circuitry 535 are implemented using software that meets the latencies) are used.

Figure 6:
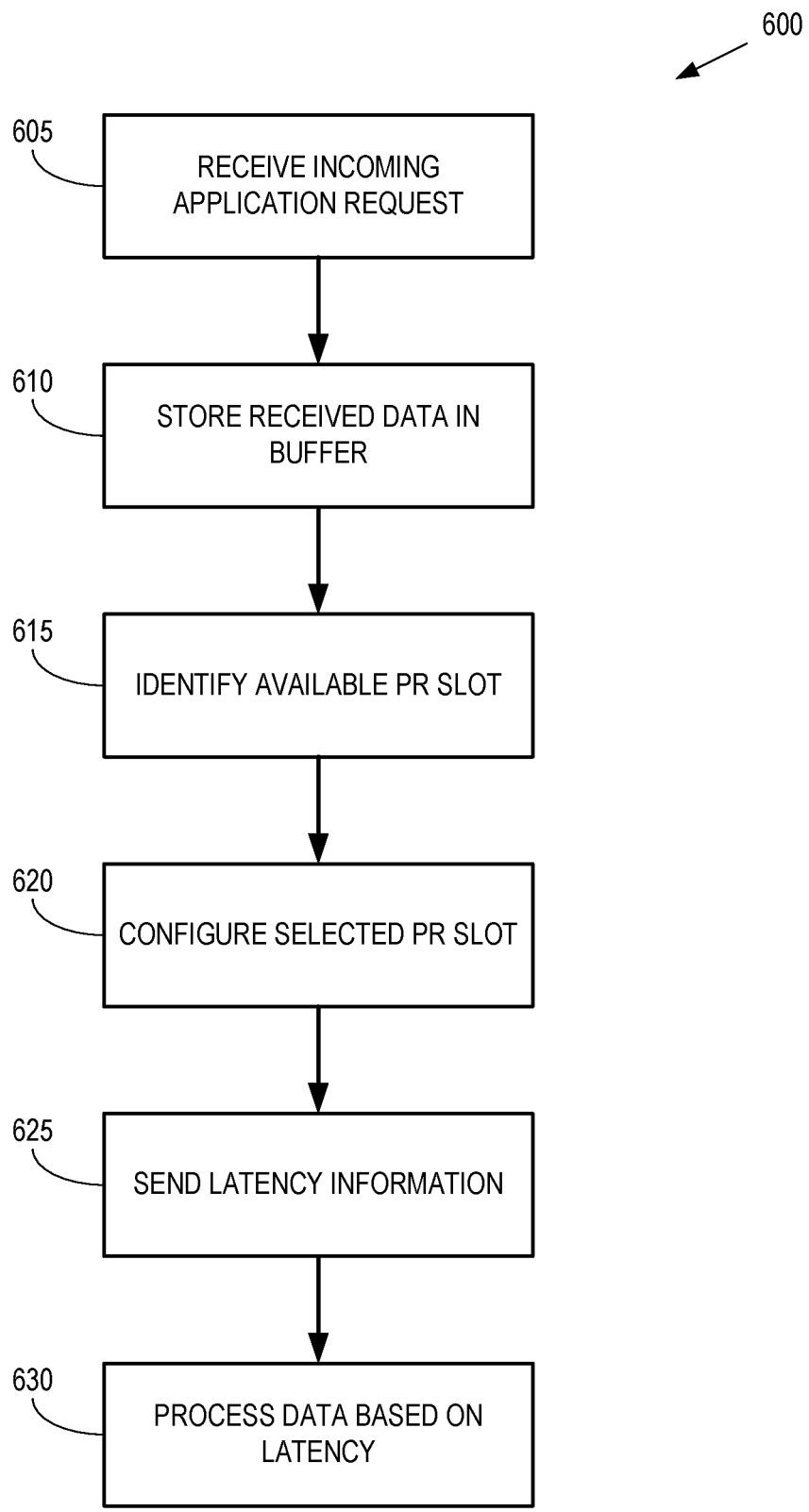
FIG. 6 is a flow diagram of a method for deterministic communication between FPGAs in a network using logical buffers according to some embodiments.

FIG. 6 is a flow diagram of a method 600 for deterministic communication between FPGAs in a network using logical buffers according to some embodiments. The method 600 is implemented in some embodiments of the servers 111-115 shown in FIG. 1, the servers 401-405 shown in FIG. 4, and the server 500 shown in FIG. 5.

At block 605, the server receives an incoming application request to allocate one or more PR slots in an FPGA to perform a task for a tenant. The application request includes instructions or data that are used to configure the allocated PR slot to perform the task. Some embodiments of the application request include information indicating a latency required by the task. At block 610, the data or instructions included in the application request are stored in a logical buffer that is reserved for storing information received in application requests.

At block 615, an available PR slot is identified in the FPGA. At block 620, the available PR slot is configured to perform the tasks indicated in the application request. Configuration is performed based on instructions or data included in the application request and stored in the logical buffer. At block 625, latency information included in the application request is conveyed to management circuitry such as the FPGA management circuitry 535 shown in FIG. 5. Data or instructions stored in the logical buffer are then processed (at block 630) based on the latency, e.g., using in order or out of order processing.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:

a) hardware-only circuit implementations (such as implementations and only analog and/or digital circuitry) and
b) combinations of hardware circuits and software, such as (as applicable):
   i. a combination of analog and/or digital hardware circuit(s) with software/firmware and
   ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a field programmable gate array (FPGA) partitioned into a set of reconfiguration slots for independent allocation to at least one tenant; and
a memory associated with the FPGA, wherein at least a portion of the memory is implemented as a set of logical buffers that are exclusively allocated to corresponding reconfiguration slots;

wherein the FPGA is configured to:
identify, based on an application request including information for a task, a first reconfiguration slot from the set of reconfiguration slots and a first logical buffer from the set of logical buffers;
reconfigure, based on the information, the first reconfiguration slot to perform the task; and
support, based on a latency associated with the task, execution of the task by the first reconfiguration slot for processing data from the first logical buffer.

2. The apparatus of claim 1, wherein the information for the task includes configuration information for the task, wherein the first reconfiguration slot is reconfigured, based on the configuration information, to perform the task.

3. The apparatus of claim 1, wherein the information for the task includes latency information indicative of the latency associated with the task.

4. The apparatus of claim 1, wherein the latency associated with the task is determined based on a setting associated with the first reconfiguration slot.

5. The apparatus of claim 1, further comprising:
a deterministic application request module (DARM) configured to receive the application request and store the information of the application request in the first logical buffer.

6. The apparatus of claim 5, further comprising:
a reconfiguration slot scheduling (PRSS) module configured to identify the first reconfiguration slot from the set of reconfiguration slots and associate the first reconfiguration slot with the first logical buffer.

7. The apparatus of claim 6, further comprising:
a reconfiguration slot initialization (RSI) module configured to reconfigure the first reconfiguration slot to perform the task based on the information which is stored in the first logical buffer.

8. The apparatus of claim 7, wherein the DARM is configured to instruct the RSI module to reconfigure the first reconfiguration slot, and wherein the PRSI module is configured to signal completion of reconfiguration of the first reconfiguration slot to the DARM and provide latency information indicative of the latency associated with the task.

9. The apparatus of claim 8, wherein the DARM is configured to initiate execution of the task by the first reconfiguration slot and to process the data from the first logical buffer in order of arrival.

10. The apparatus of claim 9, wherein the DARM is configured to store newly arriving data in the first logical buffer and to delay the newly arriving data in the first logical buffer for the latency.

11. A method comprising:
allocating a first partial reconfiguration (PR) slot from a set of partial reconfiguration (PR) slots in a field programmable gate array (FPGA) to a first tenant of at least one tenant for performing at least one task;
allocating a first logical buffer from a set of logical buffers in a memory associated with the FPGA, wherein the set of logical buffers are exclusively allocated to corresponding reconfiguration slots, and wherein the first logical buffer is exclusively allocated to the first reconfiguration slot;
storing, in the first logical buffer, at least one of instructions and data associated with the at least one task performed by the first reconfiguration slot; and
delaying newly arriving data in the first logical buffer for a latency required by the at least one task implemented using the first reconfiguration slot.

12. The method of claim 11, further comprising:
receiving an application request to allocate the first reconfiguration slot to the first tenant to perform at least one task; and
storing data associated with the application request in the first logical buffer.

13. The method of claim 12, further comprising:
identifying the first reconfiguration slot from the set of reconfiguration slots in response to the application request; and
associating the first reconfiguration slot with the first logical buffer.

14. The method of claim 13, further comprising:
reconfiguring the first reconfiguration slot to perform the at least one task based on the data stored in the first logical buffer.

15. The method of claim 14, further comprising:
signaling completion of the reconfiguration to the DARM; and
generating information indicating a latency required by the at least one task implemented using the first reconfiguration slot.

16. The method of claim 15, further comprising:
initiating execution of the at least one task by the first reconfiguration slot; and
processing data from the first logical buffer in order of arrival.

17. A server comprising:
a field programmable gate array (FPGA) partitioned into a set of partial reconfiguration (PR) slots;
a memory that supports a set of logical buffers;
a deterministic application request module (DARM) configured to receive application requests to allocate the set of reconfiguration slots to the at least one tenant to perform at least one task and store data associated with the application request in a first logical buffer from the set of logical buffers;
a reconfiguration slot scheduling (RSS) module configured to identify a first reconfiguration slot from the set of reconfiguration slots and associate the first reconfiguration slot with the first logical buffer; and
a reconfiguration slot initialization (RSI) module configured to reconfigure the first reconfiguration slot to perform the at least one task based on the data stored in the first logical buffer;
wherein the PRSI module is configured to signal completion of the reconfiguration to the DARM and to provide information indicating a latency for the at least one task implemented using the first reconfiguration slot, wherein the DARM is configured to store newly arriving data in the first logical buffer and to delay the newly arriving data in the first logical buffer for the latency.

18. The server of claim 17, wherein a number of reconfiguration slots in the set of reconfiguration slots is equal to a number of logical buffers in the set of logical buffers.

19. An apparatus comprising:
at least one processor; and
at least one memory including computer program code;
the at least one memory and the computer program code configured to, with the at least one processor, cause the apparatus at least to perform:
allocating a first partial reconfiguration (PR) slot from a set of partial reconfiguration (PR) slots in a field programmable gate array (FPGA) to a tenant for performing at least one task;

allocating a first logical buffer from a set of logical buffers in a memory associated with the FPGA, wherein the set of logical buffers are exclusively allocated to corresponding reconfiguration slots, and wherein the first logical buffer is exclusively allocated to the first reconfiguration slot;

storing, in the first logical buffer, at least one of instructions and data associated with the at least one task performed by the first reconfiguration slot; and delaying newly arriving data in the first logical buffer for a latency required by the at least one task implemented using the first reconfiguration slot.

* * * * *